(12) United States Patent
Sobol

(10) Patent No.: US 6,760,484 B1
(45) Date of Patent: Jul. 6, 2004

(54) METHOD FOR IMPROVED CONTRAST MAPPING OF DIGITAL IMAGES

(75) Inventor: Robert E Sobol, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/491,946

(22) Filed: Jan. 26, 2000

(51) Int. Cl.[7] .................................................. G06K 9/40
(52) U.S. Cl. ........................ 382/254; 382/274; 358/3.27
(58) Field of Search ............................... 382/167, 171, 382/173, 181, 209, 254, 274, 275; 345/20, 63, 77, 590, 611, 617; 348/251, 254, 606, 607, 615; 358/1.9, 3.27, 447

(56) References Cited

U.S. PATENT DOCUMENTS

| | | | | |
|---|---|---|---|---|
| 4,384,336 A | * | 5/1983 | Frankle et al. | 382/302 |
| 4,649,568 A | | 3/1987 | Kiesel et al. | 382/41 |
| 5,012,333 A | | 4/1991 | Lee et al. | 358/80 |
| 5,231,487 A | * | 7/1993 | Hurley et al. | 375/240.01 |
| 5,363,209 A | * | 11/1994 | Eschbach et al. | 358/445 |
| 5,450,502 A | * | 9/1995 | Eschbach et al. | 382/169 |
| 5,581,370 A | * | 12/1996 | Fuss et al. | 358/447 |
| 5,719,677 A | * | 2/1998 | Guerra | 356/623 |
| 5,802,214 A | * | 9/1998 | Eschbach et al. | 382/254 |
| 5,835,618 A | | 11/1998 | Fang et al. | 382/132 |
| 6,101,273 A | * | 8/2000 | Matama | 382/169 |
| 6,108,457 A | * | 8/2000 | Nevis | 382/274 |

FOREIGN PATENT DOCUMENTS

| | | | |
|---|---|---|---|
| EP | 0747855 A2 | 12/1996 | G06T/5/40 |
| EP | 0889643 A1 | 1/1999 | H04N/1/407 |

OTHER PUBLICATIONS

Rahman, et al. "Multi–scale Retinex for color image enhancement", IEEE, pp. 1003–1006, 1996.*
Chen, et al. "Adaptive sensitivity CCD image sensor", IEEE, pp. 1–4, 1995.*
Larson, et al. "A Visibility matching tone reproduction operator for high dynamic range scenes", IEEE, pp. 291–306, 1997.*

* cited by examiner

Primary Examiner—Daniel Mariam
(74) Attorney, Agent, or Firm—Steven L. Webb

(57) ABSTRACT

A method of local contrast mapping that changes the dynamic range of an original image to more closely match the dynamic range of the medium used for the reproduction. The method compresses large contrast differences between different areas of an image while preserving small contrast differences between different areas of an image.

12 Claims, 8 Drawing Sheets

(5 of 8 Drawing Sheet(s) Filed in Color)

METHOD FOR IMPROVED CONTRAST MAPPING OF DIGITAL IMAGES

FIELD OF THE INVENTION

The present invention relates generally to digital image enhancement and more specifically to a method of local contrast mapping that changes the dynamic range of an original image to more closely match the dynamic range of the medium used for the reproduction.

BACKGROUND OF THE INVENTION

When taking photographs of an outdoor scene, the brightness ratio, or dynamic range, of an area in full sunlight to another area in deep shade can exceed 1000:1 (see FIG. 1). When a reflective print is created of this scene the print is typically limited to a dynamic range of about 100:1. Because of the large mismatch between the dynamic range of the reflective print and the original scene, there needs to be some mapping or transformation of the dynamic range of the scene onto the available dynamic range of the reflective print to create a pleasing reproduction.

A common technique used to map one dynamic range onto another dynamic range is the use of a nonlinear curve, often implemented digitally with a tone map. Tone maps are lookup tables that transform numbers from an input range (1000:1 in an outdoor scene) to a new range (100:1 for a reflective print). Tone maps are typically applied globally; all points in an image that have a certain numerical value are mapped to precisely the same output value. Unfortunately when using a tone map to map a large dynamic range onto a much smaller dynamic range the resulting image often produces a sensation of reduced contrast. This reduction in contrast makes the image appear flat and unappealing (see FIG. 2).

Photographers have addressed this problem by darkroom manipulations called burning and dodging. Dodging is a technique, performed while printing a negative onto photographic paper, in which dark areas of the image are lightened by casting a shadow over the area for some portion of the total exposure time. The shadow reduces the amount of light exposure to the print thereby lightening that part of the image. The shadow is commonly produced by blocking light projected by the enlarger lens with a piece of cardboard on a piece of wire, or even with the photographer's hand. Burning is the opposite process in which additional exposure time is given to the photographic paper by increasing the amount of light exposure to some area of the print. Typically a card with a small hole is held over the print with the light falling through the hole exposing only the area of the image to be darkened.

Dodging and burning work well for large areas of slowly changing brightness, but produce halos in areas that have complex shapes. For example the tree branches in the lower left corner of FIG. 1 would be very difficult to lighten, or dodge, without leaving a halo or bright area around and between the tree branches.

Another technique used to reduce the dynamic range in a scene is the Retinex algorithm developed by John McCann of Polaroid. Retinex is based on the Retina and Cortex theory of human vision developed by Edward Land. The basic Retinex algorithm is described in U.S. Pat. No. 4,384,336 "Method and Apparatus for lightness imaging" which is hereby incorporated by reference. The Retinex algorithm reduces the dynamic range of an image by removing much of the slowly varying changes in illumination in the scene.

For images that have slowly changing illumination the original Retinex algorithm can make significant improvements in the appearance of the mapped reflective print. For images that have areas with rapidly changing levels of illumination, or even abrupt boundaries between different sources of Illumination, the original Retinex algorithm may only produce subtle improvements. For example, FIG. 3 is a reproduction of the same image as FIG. 1 except that the image in FIG. 3 received processing by the original Retinex algorithm. The bushes in the foreground and the tree in the lower left of the image have been lightened somewhat, but the effect is subtle. Overall the reproduction in FIG. 3 fails to convey the visual impact that was present in the original scene.

What is needed is a method that dramatically lightens the dark foreground in FIG. 1 without significantly changing the brightness of the cloud reflections in the water. This would imply that the large brightness ratio, or large contrast, between the reflected clouds and the tree branches in the lower left of FIG. 1 must be greatly compressed. At the same time, the small, local brightness ratios in the reflected clouds and in the foreground areas must be preserved, without compression. This is important to preserve the sensation of contrast when viewing the image. Therefore there is a need for a system that can compresses large contrast differences between different areas of an image while preserving small contrast differences between different areas of an image.

SUMMARY OF THE INVENTION

A method of local contrast mapping that changes the dynamic range of an original image to more closely match the dynamic range of the medium used for the reproduction. The method compresses large contrast differences between different areas of an image while preserving small contrast differences between different areas of an image.

Other aspects and advantages of the present invention will become apparent from the following detailed description, taken in conjunction with the accompanying drawings, illustrating by way of example the principles of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

Figure 1:
FIG. 1 is a print of an image where the image has a large dynamic range of illumination.
Figure 2:
FIG. 2 is a print of the image of FIG. 1 after modification with a global tone map.
Figure 3:
FIG. 3 is a print of the image of FIG. 1 after modification by the original Retinex algorithm.

A method of compressing large contrast differences between different areas of an image while preserving small contrast differences between different areas of an image can vastly improve the appearance of the reproduction of an image that has a large range of illumination intensity. Algorithms that locally darken or lighten an image by computing contrast differences between various portions of a scene can be significantly improved by maintaining the small contrast differences and compressing the large contrast differences. One such algorithm is the original Retinex algorithm.

In the original Retinex algorithm an output image O is iteratively formed from an input image according to the following relationship:

$$O_{x,y} = \frac{ClipToWhite(I_{x,y} - I_{xs,ys} + O_{xs,ys}) + O_{x,y}}{2}. \qquad \text{Equation 1.}$$

Where $I_{x,y}$ refers to a segmental area of the input image at location x, y. $I_{xs,ys}$ refers to a segmental area in a shifted version of the input image where the image has been displaced by some distance dx and dy relative to the original image. Both images I and O are logarithmically encoded according to a measure of brightness (or are in log space) so taking a difference is the same as computing a ratio. For example the term $I_{x,y} - I_{xs,ys}$ in equation 1 is the ratio of the intensity (or radiance) at one location in the input image with respect to the intensity (or radiance) of the image at a different location in the input image. In log space adding a term is the same as multiplying. For example adding the term $O_{xs,ys}$ in equation 1 is equivalent to taking the product of the ratio of the input intensities ($I_{x,y} - I_{xs,ys}$) with the intensity of the displaced output image ($O_{xs,ys}$). The ClipToWhite function constrains the result of the product of the ratio to remain within the maximum or minimum intensity values. For example when the range of input intensity (or radiance) values are between 0 and 255, the ClipToWhite function would reduce any value over 255 to 255 and increase any value less than zero to zero. When the result of the product of the ratio ($I_{x,y} - I_{xs,ys} + O_{xs,ys}$) is 270 the ClipToWhite function would reset the value to 255. In the original Retinex algorithm, the input images and output image are shifted relative to each other starting with large displacements. A typical initial shift would be a power of two that is about one half the width or height of the input image. The image displacements proceed in a circular pattern for several revolutions. Then, the displacements are halved and the processes is repeated, until the displacement reaches zero (See U.S. Pat. No. 4,384,336).

The ratio of the intensity (or radiance) of the image at two different locations ($I_{x,y} - I_{xs,ys}$) is a measure of the relative contrast difference (or contrast ratio) of one part of the image compared to another part of an image. For example, the illumination intensity of a pixel in of one of the branches in the tree in the lower left-hand corner of image 1 is 8. The illumination intensity of a pixel in the water behind the branch is 220. Therefore the ratio of the intensities between the branch and the water is 220/8=27.5 (or 1.44 in log space). The illumination intensity of one part of a cloud in the sky is 247. The illumination intensity of a different part of the sky is 215. The ratio of the intensities between these two different parts of the sky is 247/215=1.15 (or 0.06 in log space).

The current invention compresses the large intensity ratios and preserves the small intensity ratios. To compress the large ratios and preserve the small ratios a tone map or look up table (LUT) can be used. The LUT is used to modify the ratio of intensity differences between different areas of the input image (see equation 2).

$$O_{x,y} = \frac{ClipToWhite(LUT(I_{x,y} - I_{xs,ys} + O_{xs,ys}) + O_{x,y}}{2}. \qquad \text{Equation 2.}$$

Figure 4:
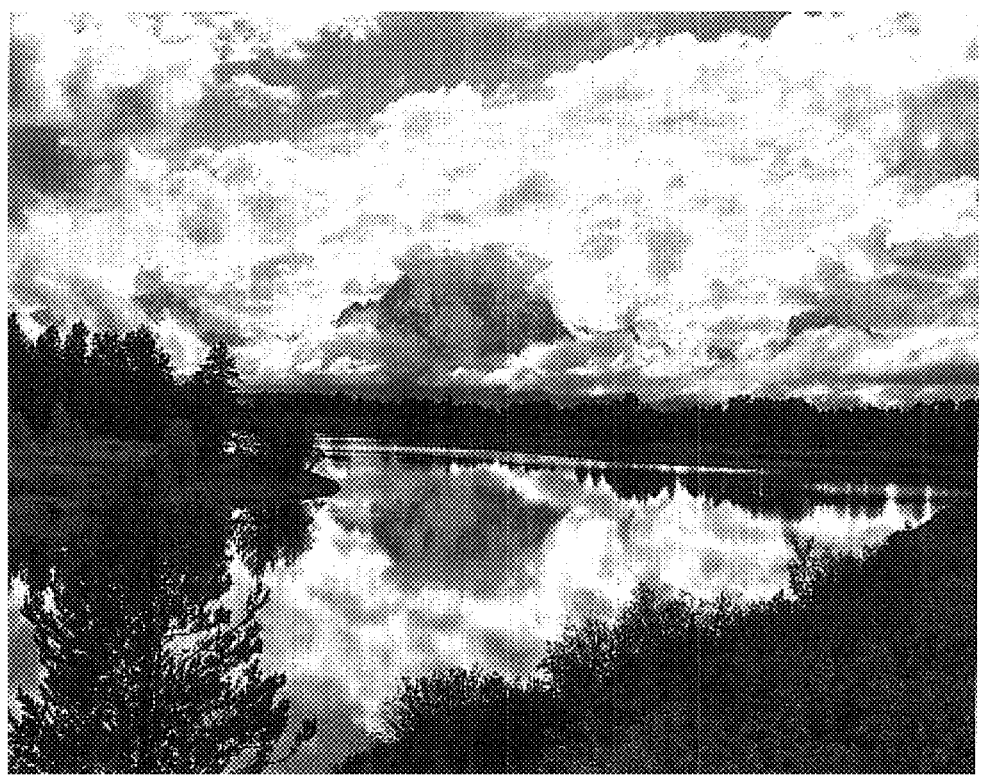
FIG. 4 is a print of the image of FIG. 1 after modification with a 1 -to-1 slope using the method according to the current invention.
Figure 6:
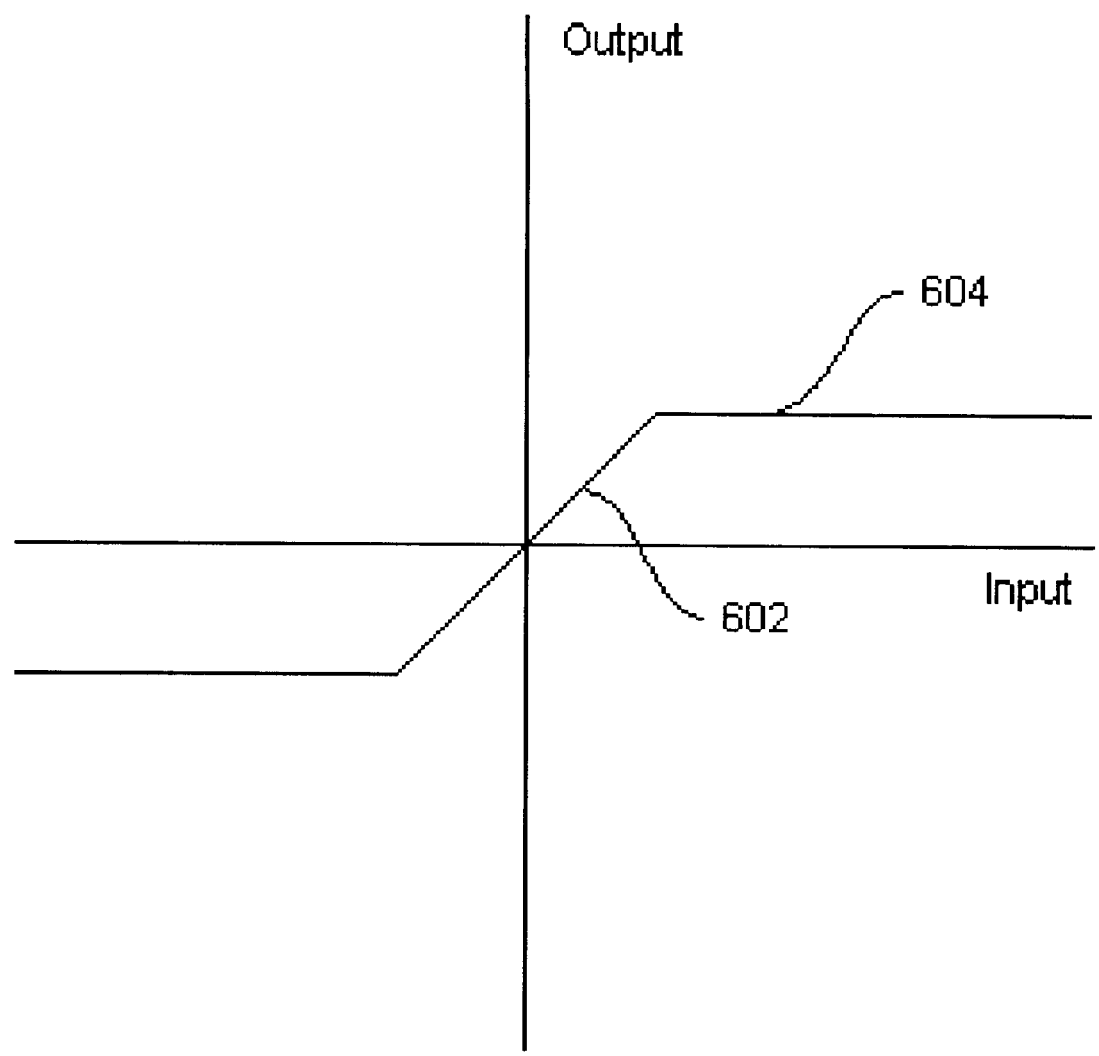
FIG. 6 is a tone map with a one-to-one slope in accordance with the present invention.

The LUT or tone map consists of two parts. A line slope of 1:1 passing through the origin (602) is used to preserve the small differences (see FIG. 6). A hard limit (604) is used to compress the large contrast differences. The hard limit is set to limit the maximum ratio of illumination, for example a hard limit of 4-to-1 (or 0.6:1 in log space) may be used. Using Equation 2 with a line slope of 1-to-1 and a hard limit of 4-to-1 (0.6 in log space), image 1 was modified to create FIG. 4. By compressing the large contrast differences while preserving the small contrast differences the overall sensation of contrast has been maintained while the overall dynamic range of the scene has been compressed. These results are impossible to recreate in a darkroom without leaving some halo around the branches in the tree in the lower left corner of the image.

Figure 5:
FIG. 5 is a print of the image of FIG. 1 after modification with a 1.8 slope using the method according to the current invention.
Figure 7:
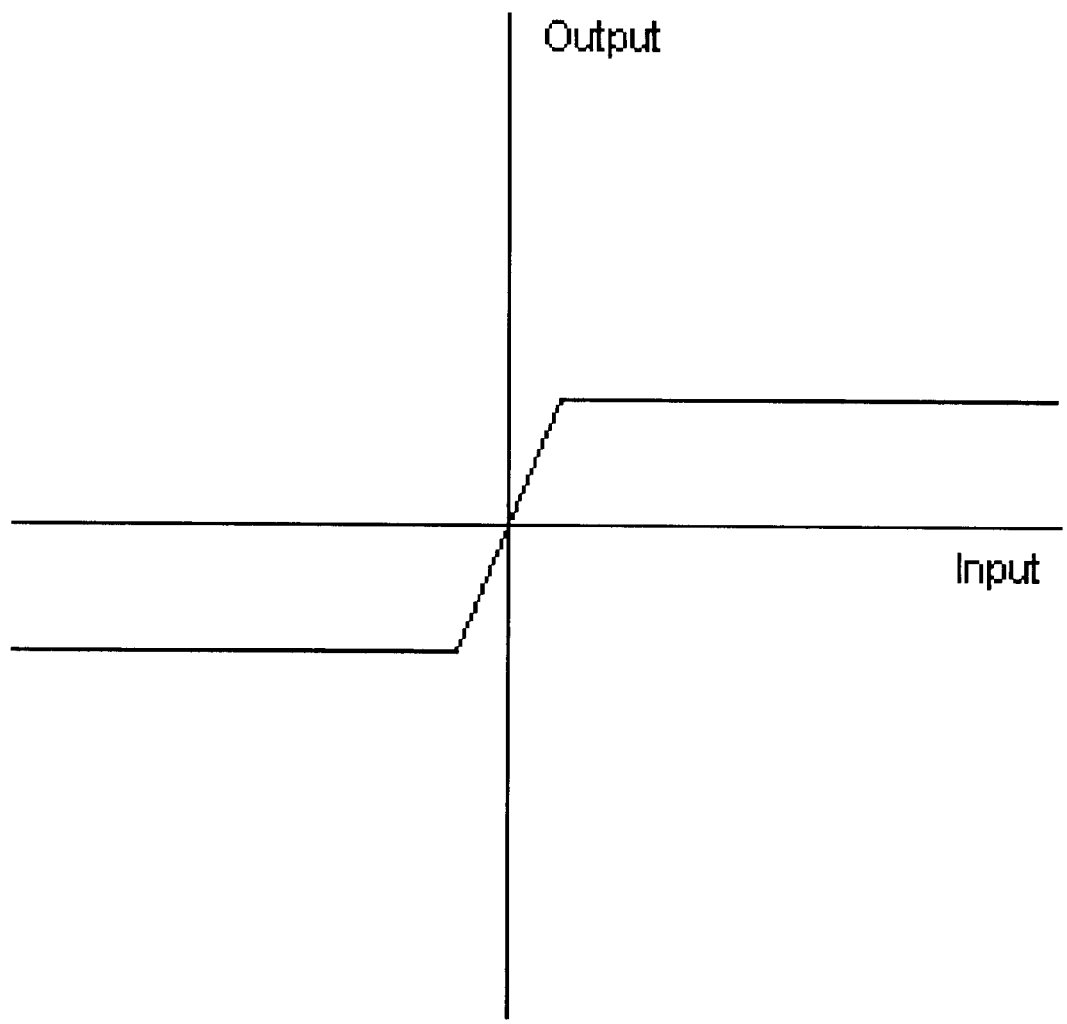
FIG. 7 is a tone map with an increased slope in accordance with the present invention.

The slope of the line passing through the origin in the tone map can be increased (see FIG. 7) or decreased (not shown) to adjust the sensation of local contrast without strongly affecting the compression of the large contrast differences of the image. For example, a slope through the origin of about 0.85 can improve harsh lighting from an electronic flash in an image of a person. FIG. 5 was created, using equation 2, with a slope of 1.8-to-1 and a hard limit of 4-to-1. FIG. 5 has a higher level of local contrast and has maintained the compression of the large contrast differences.

Figure 8:
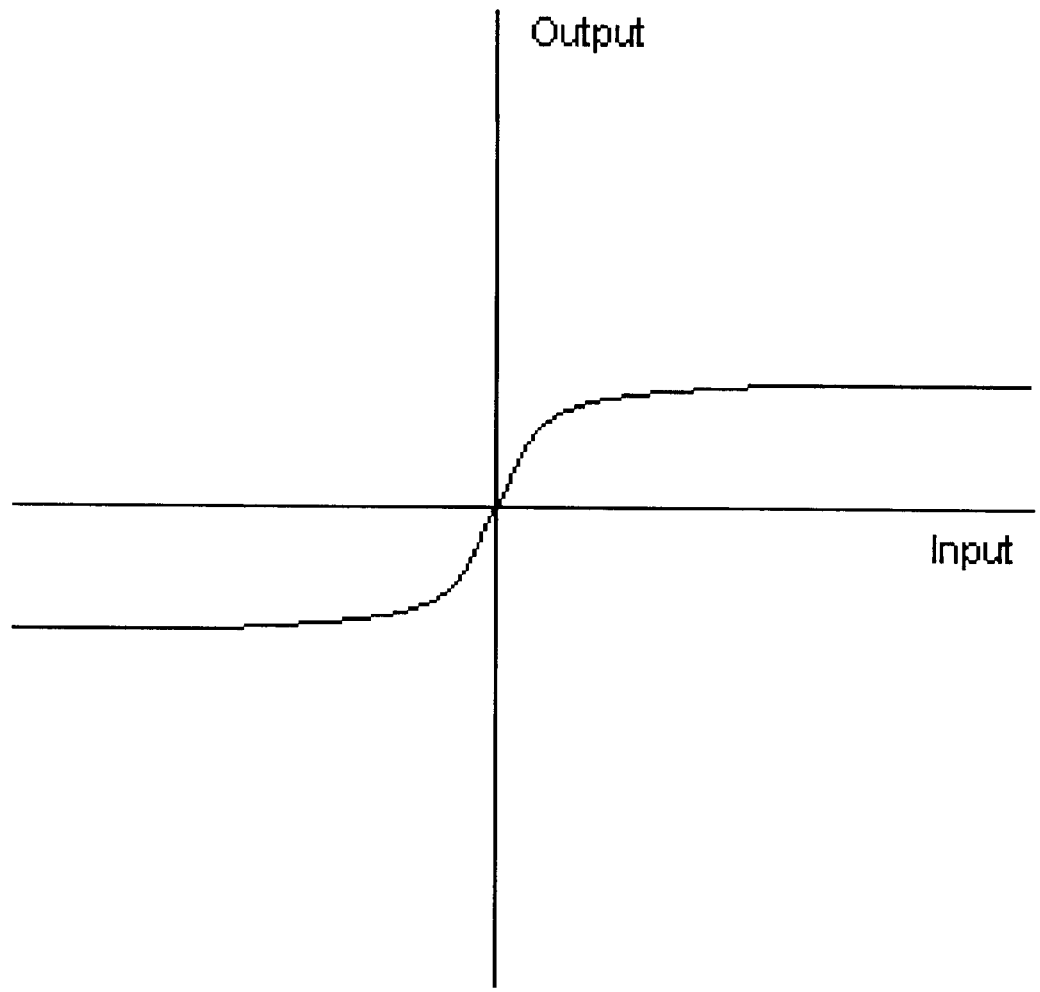
FIG. 8 is a tone map with a smooth shape in accordance with the present invention.

Adjusting the hard limit of the ratio of intensities primarily controls the amount by which the darkest areas in an image are brightened. A higher limit (such as a density ratio of 1.5) reduces the amount of brightening and compression. A lower limit (such as a density ratio of 0.4) increases the amount of brightening and compression. The shape of the curve in the tone map can also be changed. For example the sharp change from the line passing through the origin to the hard clip limit can be modified to create a smoothly changing function (see FIG. 8).

Forming the output image O iteratively from the shifted input image at the full resolution of the input and output images, is a computationally intensive process. U.S. Pat. No. 4,750,211 "Method and Apparatus for Image Processing With Field Portions", hereby included by reference, discloses a method of processing images at reduced resolution. Combining the method disclosed in U.S. Pat. No. 4,750,211 with the current invention can reduce the number of calculations required to produce an improved output image.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of changing the dynamic range of an original image to more closely match the dynamic range of the medium used for a reproduction, comprising:

preserving small contrast differences between different areas of the original image;

limiting to a maximum contrast difference the contrast differences between different areas of the original image and where the maximum contrast difference in the original image is limited to a ratio of 4-to-1 or less.

2. The method of claim 1 where a look up table is used to preserve the small contrast differences while limiting the maximum contrast differences in the original image.

3. The method of claim 1 where the small contrast differences are preserved with a slope of one-to-one.

4. The method of claim 3 where the one-to-one slope passes through the origin.

5. The method of claim 1 where the small contrast differences are enhanced by using a slope greater than one-to-one.

6. The method of claim 1 where the small contrast differences are reduced by using a slope smaller than one-to-one.

7. A method of improving an apparatus that sequentially determines a comparative measure of the radiance information for providing a new intermediate value of each such measure in response to the product of a ratio function of the radiance information associated with each of a first named segmental area and with each of a second named segmental area and of a like measure previously determined for the second named segmental area, and determining a sequentially new value of each said measure in response to a selectively weighted averaging of the new intermediate value and a like measure previously determined for the first named segmental area, comprising:

preserving the small contrast differences of the ratio function;

limiting to a maximum contrast difference the contrast differences of the ratio function and where the maximum contrast difference in the original image is limited to a ratio of 4-to-1 or less.

8. The method of claim 7 where a look up table is used to preserve the small contrast differences while limiting the maximum contrast differences in the original image.

9. The method of claim 7 where the small contrast differences are preserved with a slope of one-to-one.

10. The method of claim 9 where the one-to-one slope passes through the origin.

11. The method of claim 7 where the small contrast differences are enhanced using a slope greater than one-to-one.

12. The method of claim 7 where the small contrast differences are reduced using a slope smaller than one-to-one.

* * * * *